US005732231A

United States Patent [19]

Evans, III

[11] Patent Number: 5,732,231

[45] Date of Patent: Mar. 24, 1998

[54] FUNERAL HOME DISPLAY MONITOR APPARATUS

[75] Inventor: Harry Evans, III, HCR 80, Box 483, Cuba, Mo. 65453

[73] Assignees: Harry Evans, III; Harry Evans, Jr., both of Cuba, Mo.

[21] Appl. No.: 638,426

[22] Filed: Apr. 26, 1996

[51] Int. Cl.$^6$ .......... G06F 3/00

[52] U.S. Cl. .......... 395/339

[58] Field of Search .......... 395/339, 349, 395/352, 353, 354, 227, 615; 364/479.01–479.14

[56] References Cited

U.S. PATENT DOCUMENTS

| | | | |
|---|---|---|---|
| 5,036,472 | 7/1991 | Buckley et al. | 364/479 |
| 5,339,393 | 8/1994 | Duffy et al. . | |
| 5,408,417 | 4/1995 | Wilden | 364/479 |
| 5,552,997 | 9/1996 | Cammon et al. | 364/479.03 X |
| 5,559,714 | 9/1996 | Banks et al. | 364/479.03 |
| 5,561,604 | 10/1996 | Buckley et al. | 364/479.05 |
| 5,561,811 | 10/1996 | Bier . | |
| 5,594,661 | 1/1997 | Bruner et al. | 364/514 R |

*Primary Examiner*—Mark R. Powell

*Assistant Examiner*—A. Katbab

*Attorney, Agent, or Firm*—Polster, Lieder, Woodruff & Lucchesi

[57] ABSTRACT

An apparatus located in a funeral establishment for displaying information about a deceased person whose visitation is or was in the funeral establishment. The apparatus includes a terminal display with one or more visual displays for visually displaying images of the deceased and textual information about the deceased, and audio capabilities to play sound recordings of or about the deceased. The terminal display is mounted in or on a stand for viewing by both standing and sitting people. Further included in the apparatus, a storage memory stores audio recordings, visual images, and textual information about the decedent. Additional sound recordings, visual images, and textual information stored on audio and video cassettes may be received by the apparatus for inclusion in the memory storage through a cassette player. Similarly, information stored on CD-ROM and magnetic discs may be received for storage by the apparatus through respective player units. People both at the funeral establishment and out-of-town may add additional information about the decedent to the storage memory. The apparatus allows information about the decedent stored in the memory to be duplicated for permanent recording.

15 Claims, 1 Drawing Sheet

FUNERAL HOME DISPLAY MONITOR APPARATUS

BACKGROUND OF THE INVENTION

This invention relates to remembrances for deceased individuals, and more particularly, to a monitoring apparatus for providing information concerning the life of a deceased to visitors to a funeral home paying their last respects to the deceased, as well information about the time and place of burial.

When someone dies, there is usually a funeral or visitation held at a funeral home where the decedent's body can be viewed by those wishing to pay their last respects to the deceased and his or her family. It is commonplace for local newspapers to publish an obituary of the deceased. Ordinarily, however, unless there are a number of salient features about the decedent's life, the obituary is a rather terse listing of the decedent's name, closest surviving relative or relatives, membership in prominent organizations, funeral home where the decedent was taken, and time and place of the funeral service and burial. Many people lead rich, full lives which does not bring them notoriety or attention. They and their achievements are nonetheless important to their family, friends, and acquaintances.

Sometimes, the decedent's family may display a picture of the deceased next to their casket or funerary urn. However, there is usually not enough time or room to display pictures or other remembrances of the deceased which would help those visiting the funeral home to fully appreciate all that the deceased meant to those who knew him or her. Further, it is commonplace that many of those who may have known the deceased and their accomplishments best live far away and will not be able to visit the deceased or take part in any service or remembrance. It would be advantageous to provide the capability to the decedent's family and friends to display pertinent information about the deceased, and to allow this information to be provided in a permanent form to those who want it. It would also be advantageous if the display allowed visitors and person's unable to visit the deceased; to add remembrances of their own to the material displayed. Because of the capabilities of existing telecommunications systems, including the Internet, and the availability of on-line personal computers (PCs), information about a decedent may be readily transmitted back and forth between the funeral establishment and a remote location.

Finally, it is not uncommon for a family to reuse the same funeral establishment for the burial of their deceased. During a visitation, it often occurs that the conversation turns to previously deceased members of the family whose funeral service was held at the establishment. It would therefore be beneficial if the establishment maintained permanent records of visual, audio, and textual information about these individuals, about the decedent being visited, so family members and friends could have this information readily available to them if they wished to review it.

SUMMARY OF THE INVENTION

Among the several objects of the present invention may be noted the provision of a display terminal for use in funeral homes, funeral parlors, and similar establishments where deceased individuals may be visited by relatives and friends;

the provision of such a display terminal to provide information, including text, images, and audio, about a deceased individual and including the time of death and time and place of burial;

the provision of such a display terminal to allow entry, by funeral home personnel of information supplied to the funeral home by members of the decedent's immediate family on site, or remotely, via a telephone link, the Internet, or other on-line service, to a personal computer at the funeral establishment;

the provision of such a display terminal to further allow subsequent entry of information, by funeral home personnel, about the decedent supplied by other family members, friends, and acquaintances of the deceased on site, or remotely by the telephone link, or on-line system, to the PC;

the provision of such a display terminal to allow entry or retrieval of information about the deceased from distant sites so family members and others unable to visit the deceased can have information about the deceased of which they want to make others aware entered into a PC, or retrieved from the PC, via the telephone link or on-line system;

the provision of such a display terminal having a viewing screen and sound system for displaying the text, images, and audio about the deceased, the display terminal being conveniently located for viewing within or adjacent to a funeral parlor, lounge area of the funeral establishment, or other convenient location;

the provision of such a display terminal to allow a hard copy of the information being displayed to be printed for people viewing the display;

the provision of such a display terminal to play CD-ROM and magnetic discs, video cassettes, and tapes having images or audio of the decedent and related textual information, to scan information from such cassettes or discs into a memory of the display terminal or to input information to the PC via a direct or network connection, to provide CD-ROM disc and video cassette copies of the displayed information, and to transmit the information to a PC at a remote location;

the provision of such a terminal display to include separate displays, including viewing screens and audio, for each decedent currently laid out at the funeral establishment, and for those decedents whose funerals were previously handled by the funeral home;

the provision of such a terminal display to have a single display but the capability of individual viewers to select which decedent's information is to be displayed at any one time; and, the provision of such a terminal display to fit in with the surroundings of the funeral establishment and to not clash with the dignified atmosphere thereof.

In accordance with the invention, generally stated, an apparatus is located in a funeral establishment for displaying information about a deceased person whose visitation is in the establishment or Whose funeral was previously held at the funeral establishment. A terminal display includes one or more visual displays for displaying visual images and audio of the deceased and textual information about the deceased. The display is mounted in or on a stand for viewing by people both standing and sitting. The visual images, audio, and textual information are stored in a memory and a selection module allows people to readily select which information about a decedent will be displayed, so a person can select visual images, audio, or textual information. A disc player or similar digital device receives CD-ROM and magnetic discs containing the images, audio and text for display purposes. The apparatus further allows copies of the information to be made so it can be kept permanently.

Further, the apparatus allows people both at the funeral establishment and out-of-town to add additional information about the decedent to the memory. Other objects and features will be in part apparent and in part pointed out hereinafter.

BRIEF DESCRIPTION OF THE DRAWINGS

In the drawings.

Corresponding reference characters indicate corresponding parts throughout the drawings.

DESCRIPTION OF A PREFERRED EMBODIMENT

Figure 1:
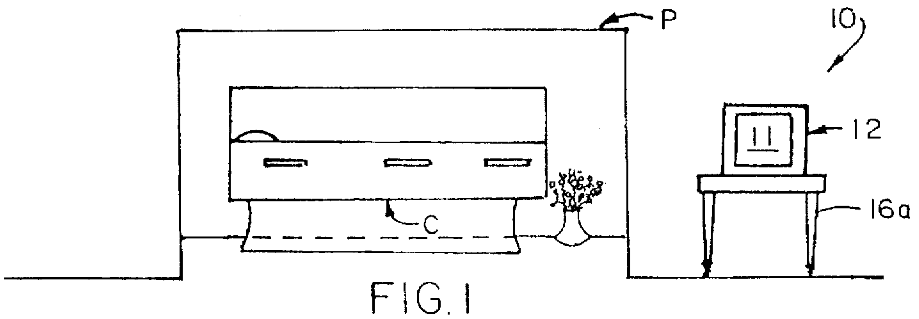
FIG. 1 is a representation of the apparatus of the present invention as used in a funeral establishment.

Referring to the drawings, an apparatus of the present invention is indicated generally 10 in the drawings. The apparatus is located in a funeral establishment and is used to display information about a deceased person whose visitation is currently in the funeral establishment, or whose visitation was previously in the establishment. In FIG. 1, a casket C is located in a funeral parlor P with the body of a decedent laid out in the casket. Apparatus 10 may be conveniently located outside the funeral parlor so visitors coming to view the deceased and comfort his or her family can view images of the deceased, listen to audio of or about the deceased, and read textual information about the deceased. Or, it may be located in a lounge area, or a special viewing area set aside by the funeral establishment. The visual images may be taken from photographs, movies, or video cassette recordings in which the deceased appears. The audio may be acquired from various voice recording media. The text may be an obituary prepared by a newspaper and reprinted with permission, or remembrances prepared by the deceased's family and friends, material prepared by the deceased before his death, or by a writer hired by the funeral establishment for such purposes. In any event, the material supplied to the funeral establishment is entered into a memory of the apparatus by establishment personnel.

Figure 2:
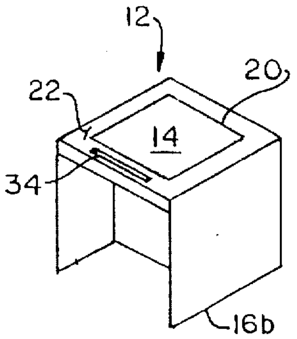
FIGS. 2–4 are respective perspective views of different embodiments of the apparatus; and, FIG. 5 is a block diagram representation of the apparatus.
Figure 3:
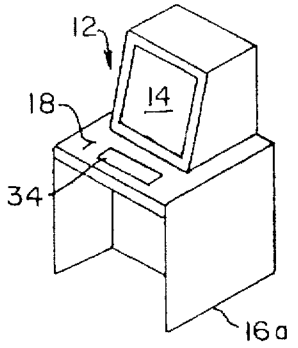
Figure 4:
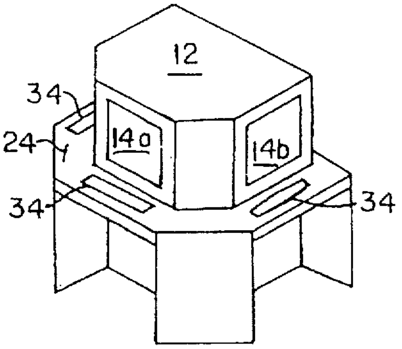
Figure 5:
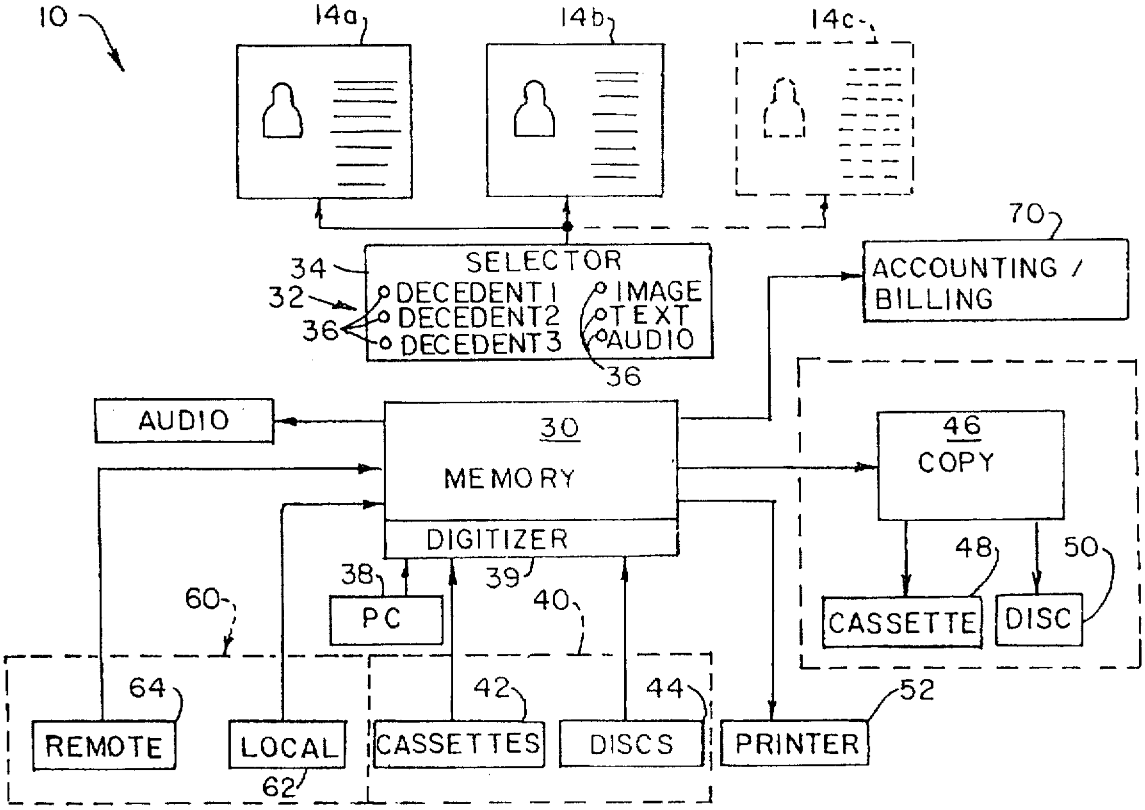

Apparatus 10 includes a display terminal means 12 for displaying visual images of the deceased and the prepared textual information about the deceased. The display terminal means may include a single display terminal 14 such as shown in FIGS. 1–3, or multiple display terminals **14*a*–14*c* such as shown in FIGS. 4 and 5. A stand 16 is provided for the display terminal means. As shown in FIGS. 1 and 3, a stand 16*a* has a top surface 18 upon which a single display terminal 14 rests. In FIG. 2, a stand 16*b* has an opening 20 in its upper surface 22, and a display terminal 14 is set in this opening. In FIG. 4, a stand 16*c* is designed to accommodate a display terminal means 12 having multiple terminals 14. Here, the stand allows three terminals to be set upon its top surface 24**. The top surface is shown to be generally rectangular in plan but with chamfered edges at the front corners of the stand. The monitors are placed on front and right and left sides of the top so that persons viewing one monitor will not interfere with those viewing another. In addition, the stand forms a table and is sufficiently tall so that people wishing to view the display terminals can do so either standing or sitting. Regardless of the type of stand used, each stand is designed and finished so to be apropos to the funeral establishment where it is used. Thus, the stand may be of wood with an appropriate finish. Further, it will be understood that each display has its own associated audio system for playing audio of or about the deceased.

Apparatus 10 next includes memory means 30 for storing visual images, audio, and textual information about decedents currently being visited at the establishment, for viewing on the display terminals, as well as similar information about deceased individuals whose visitation and funeral were previously handled by the establishment. A selection means 32 includes a selector panel 34 having a series of switches or buttons 36 for allowing a person to select from which of a number of decedents' for whom the stored information should be displayed. Besides the switches or buttons, the selection means could also include a touch screen or track ball without departing from the scope of the invention. If the apparatus includes only one display terminal, then the selection means allows the user to select the decedent. The selection means further allows the person to select whether he or she wants to view visual images, audio, textual information, or a combination of this information about the decedent. Where a significant amount of visual, audio, and textual information is available, means 32 allows the person to select from a plurality of images, audio clips, and information segments which to view or listen to. These latter features are also available when the apparatus has a plurality of display terminals; although here, information about a decedent may be displayed only on one terminal.

The visual images, audio, and textual information a decedent is entered into memory 30 using a local or remote PC terminal 38, as well as a digitizer 39. Information from the remote site is transferred via telephone line, the Internet, or other convenient on-line service. Apparatus 10 further includes means 40 for allowing information (visual images, audio, and text) contained on video and audio cassettes, CD-ROM and magnetic discs, to be stored in the memory. Means 40 includes both a video cassette player 42, and CD-ROM disc player 44 to be mounted in a stand 16 so the cassettes and discs can be conveniently loaded for playing. Information on a cassette or disc is scanned into the memory using digitizer 39. Further, the apparatus includes copying means 46 for copying information stored in the memory to a video or audio cassette, or CD-ROM or magnetic disc. Means 46 includes a cassette player 48 or disc player 50. Someone wishing to have a cassette or disc copy of the information about a decedent can bring their own cassette or disc (or purchase the cassette or disc from the funeral establishment), have it loaded into the copier, and have the information stored in the memory downloaded onto the cassette or disc. If the individual wanting the information is at a remote site, this information can be downloaded from the memory remotely, via the telephone link, Interact, or on-line service to a PC at the remote site. In addition, the apparatus includes a printer 52 for printing the information stored in the memory so a person requesting a print out of the information can have one. Typically, the printer would be remote from the stand so to not unduly take up space or make disturbing noises while printing a copy of the information.

Because of the wide variety of people who knew the decedent, it is often possible that these individuals may have information about the decedent they would want to share with others. The apparatus includes means 60 for allowing this information to be stored in the memory 30 together with the other information. For this purpose, means 60 includes a local terminal 62 in which the person, with the assistance of establishment personnel can have their stories, reminiscences, photos, voice recordings, etc. added to the previously stored information about the decedent. Also, it often happens that a distant relative or friend who cannot make the funeral, would want to add their reminiscences as well. Apparatus 10 includes a remote terminal 64 by which this can be done using telephone lines, the Internet, or other on-line service. Now, the person goes to a local funeral establishment near where they live, and has someone there enter the information into a corresponding apparatus at that location. The information is then routed over an appropriate communications network to terminal 64 so it can be stored in the memory.

Finally, apparatus 10 includes a billing means 70. While the cost of using the apparatus may be included in the base cost of a funeral, the cost of copies, allowing people to add additional information, etc., may be separately billed. Means 70 records each billable usage of the apparatus, together with the stated charge for that usage. Once the funeral is over, means 70 provides this information to the management of the establishment so they can include it in the final funeral bill. Or, alternatively, the establishment may charge the individuals having copies made, or adding information, and means 70 allows bill for these usages to be created and presented to the user at the time they use the apparatus.

What has been described is a display terminal for use in funeral homes and the like where deceased individuals may be visited by their family and friends. The terminal provides images, audio, and textual information about the deceased. Further, the terminal allows entry of information supplied to the funeral home by the decedent's immediate family, but also allows subsequent entry of information about the decedent by other family members, friends, and acquaintances of the deceased. In addition, family members and others unable to visit the deceased may remotely enter information about the deceased. The terminal has a viewer screen for displaying both the text and images about the deceased, and the terminal can supply a print out of the information being displayed for people to keep as a permanent record. The terminal has the capability of playing CD-ROM and magnetic discs, video cassettes with images of the decedent, voice recordings of or about the decedent, and accompanying text, and the terminal can make and provide copies of this information in the appropriate format. The terminal may alternately include separate displays for each decedent laid out at the establishment, or a single display with the capability of individual viewers to select which decedent's information they wish to view. Finally, the terminal display is designed to be compatible with the other furnishings of the funeral establishment so to maintain the dignified atmosphere of the establishment.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Apparatus located in a funeral establishment for displaying information about a deceased person whose visitation is in the funeral establishment comprising:

display terminal means for displaying visual images and audio recordings of the deceased, and textual information about the deceased;

a stand for the display terminal means, said stand allowing the display terminal means to be viewed by people both standing and sitting;

memory means for storing visual images, audio recordings, and textual information about a decedent;

information entry means for enabling people to add audio, visual, or textual information about the decedent to the memory means for permanent storage and display to subsequent users on said terminal means; and, selection means for allowing a person to select which of a number of decedents' information should be displayed, said selection means further allowing the person to select visual images, audio recordings, or textual information, and for allowing the person to select from a plurality of images, audio recordings and information segments which to view or listen to.

2. The apparatus of claim 1, wherein the information entry means includes data entry means for entering audio recordings of or about a decedent into the memory means.

3. The apparatus of claim 2, wherein the information entry means further includes digitizing means for scanning visual images of the decedent and textual information about the decedent into the memory means.

4. The apparatus of claim 3 further including means for reproducing the images, audio recordings, and textual information about a decedent so the person using the apparatus can have a copy of the information.

5. The apparatus of claim 4 further including means for playing audio and video cassettes containing audio recordings, images and text and for storing said information in said memory means.

6. The apparatus of claim 5 wherein said playing means includes means for receiving an audio or video cassette and said reproducing means includes means for copying information in the memory means onto the respective cassettes.

7. The apparatus of claim 5 wherein said playing means includes means for playing a CD-ROM or magnetic disc and said reproducing means includes means for copying information from the memory means onto said disc.

8. The apparatus of claim 2 further including billing means for charging copies of the images, audio, and textual information reproduced for others.

9. The apparatus of claim 1 wherein said display terminal means includes a single display and said selection means includes means for selecting from a plurality of decedents whose information will be displayed.

10. The apparatus of claim 9 wherein said display terminal means includes a plurality of displays and said selection means includes means for selecting which decedent's information is displayed on which terminal.

11. The apparatus of claim 10 wherein said displays are mounted on a top surface of said stand at angles to each other for a person viewing one display to not interfere with a person viewing another display.

12. The apparatus of claim 9 wherein said display terminal means includes a display mounted flush to a top surface of said stand.

13. The apparatus of claim 9 wherein said display terminal means includes a display mounted on a top surface of said stand.

14. The apparatus of claim 1 wherein said information entry means further includes means for allowing someone at a remote location to access the memory means to obtain information about the decedent.

15. The apparatus of claim 14 wherein said information entry means further includes means for allowing the person at the remote site to enter information about the decedent into the memory means.

* * * * *